July 29, 1969 R. L. HARTMAN 3,458,715
EXPONENTIAL GENERATOR UTILIZING A FOUR-LAYER DIODE-CAPACITOR ARRANGEMENT
Filed Oct. 24, 1967
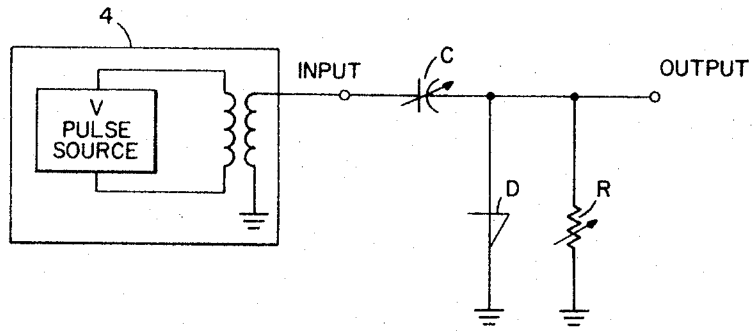
Richard L. Hartman,
INVENTOR.
BY Harry M. Saragovitz
Edward J. Kelly
Herbert Berl
Aubrey J. Dunn

1

3,458,715

EXPONENTIAL GENERATOR UTILIZING A FOUR-LAYER DIODE-CAPACITOR ARRANGEMENT

Richard L. Hartman, Huntsville, Ala., assignor to the United States of America as represented by the Secretary of the Army Filed Oct. 24, 1967, Ser. No. 677,803

Int. Cl. H03k 3/40

U.S. Cl. 307—108 4 Claims

ABSTRACT OF THE DISCLOSURE

A simple passive device with variable capacitance connected between its input and output and a resistor and four layer diode connected in parallel between the output and ground. The four layer diode allows the capacitor to rapidly charge from an input pulse, but to discharge exponentially through the resistor.

Dedicatory clause

The invention described herein may be ma ıufactured, used, and licensed by or for the Government for governmental purposes without the payment to me of any royalty thereon.

Background of the invention

The use of an exponential generator to drive the X-axis of an oscilloscope or recorder in order to measure the time constant of an unknown process is well established. However, a typical generator consists of a complex integrating circuit including active devices such as tubes and requires a DC power supply. Great care in circuit design and choice of components is necessary to get output conformity with an exponent over a range exceeding 10 to 1 due to inherent nonlinearity of tubes and other active devices.

There is a need for an exponential generator which is simple in design, generates a true exponent wave, and requires no power supply. To precisely measure such things as the electron spin lattice relaxation time in a laser crystal, the loss characteristic of a delay line, or the ringing time of a vibrating body, an exponential generator which can be easily varied and calibrated is valuable.

Accordingly, it is an object of this invention to provide an easily constructed, low cost exponential generator which:

Requires no power supply;

Conforms with an exponent over a range of 1000 to 1, primarily because no active devices are included;

Has no inherent limit to the range or spurious behavior at the output; and

Has a time constant determined only by R and C thereby allowing ease of calibration.

Summary of the invention

This invention relates to a simple passive exponential generator which consists of a variable condenser connected between the input and the output, a variable resistor R connected between the output and ground, and a four layer diode connected between the output and ground. The heart of the circuit is the four layer diode. At a specified critical voltage, the diode switches into a low resistance state, and stays there until the current falls below a minimum holding current. A pulse of voltage higher than the switching voltage of the diode is applied at the input to the generator. The diode switches and offers a

2 very low impedance. The capacitor charges quickly. There is almost no signal at the output of the generator. When the pulse turn off, there is a reverse voltage across the diode. The four layer diode offers a very high impedance to the reverse voltage. The reverse voltage decays with a time constant determined by the resistor and the capacitor to give a desired exponent.

Brief description of the drawing

The single figure drawing is a schematic diagram of the present invention.

Description of the preferred embodiment

The device comprises a variable capacitor C and a four layer diode D and a variable resistor R connected in parallel between the output of the device and ground. In this circuit a voltage pulse from pulse source 4 is applied to the input. The voltage of the pulse is higher than the switching voltage of the four layer diode. At a specified critical voltage, the diode switches into a low resistance state and stays there until the current through it falls below a minimum holding current. Very little voltage appears at the output while the pulse is being applied.

After the pulse is removed, there is a reverse voltage across the diode from the charged capacitor. The diode presents a very high impedance to the reverse voltage. The reverse voltage decays with a time constant determined by resistor R and capacitor C. After the pulse is removed, there is a sharp downward spike at the output followed by resistor R and capacitor C. After the pulse is removed, the output can be reversed by reversing the polarity of the diode and the polarity of the pulse. The time constant can be continuously adjusted by adjustments of variable capacitor C or variable resistor R.

The four layer diode offers the advantage over a conventional diode that high voltages may be used, the forward resistance is very low, the reverse resistance is uniformly high around the zero point, and the switching time is so fast that the voltage at the output, for all practical purposes, instantaneously becomes the voltage of the capacitor. The circuit thus offers a true exponent as there are no active elements or no non-linear elements in the circuit.

While the invention has been described with reference to a preferred embodiment thereof, it will be apparent that various modifications and other embodiments thereof will occur to those skilled in the art within the scope of the invention. As an example, variable capacitor C could be replaced with a bank of capacitors, any one of which could be selected by way of a selector switch.

I claim:

1. As exponential generator having an input and an output; pulse input means connected to said input; a capacitor connected between said input and said output; a resistor connected from said output to ground; and a switching means connected from said output to ground whereby said switching means switches from a high impedance to a low impedance when a pulse is applied by said input means and switches from said low impedance to said high impedance when said pulse is removed.

2. An exponential generator as set forth in claim 1 wherein said input means is a voltage pulse source having a transformer output, said transformer having a primary and a secondary winding, said primary winding being connected to a voltage pulse source and said secondary winding having one side connected to said input and one side connected to ground.

3. An exponential generator as set forth in claim 2 wherein said capacitor is variable and said resistor is variable.

4. An exponential generator as set forth in claim 3 wherein said switching means is a four layer diode.

References Cited

UNITED STATES PATENTS

| | | | |
|---|---|---|---|
| 3,032,270 | 5/1962 | Corbin | 320—1 X |
| 3,115,593 | 12/1963 | Hauer | 320—1 X |
| 3,144,567 | 8/1964 | Moehlmann | 320—1 X |
| 3,343,006 | 9/1967 | Attwood | 307—287 X |
| 3,375,378 | 3/1968 | Vandemore et al. | 307—108 X |

ROBERT K. SCHAEFER, Primary Examiner

T. B. JOIKE, Assistant Examiner

U.S. Cl. X.R.

307—268,287,324; 320—1